PRINT DEVICE SHIFTING MEANS FOR EFFECTING INTERSPERSED PRINTING

Filed April 1, 1954 12 Sheets-Sheet 1

Fig. 1

| SPACES | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|
| TYPE CARRIER | 10 | | 9 | | 8 | | 7 | | 6 | | 5 | | 4 | | 3 | | 2 | | 1 | |
| FIRST PRINT. | | | | | | | | | | | | | 1 | | 3 | | 0 | | 8 | |
| SECOND PRINT. | | | | | | | | | | | | | | | | 5 | | | | 0 |
| COMPLETE IMPRESSION | | | | | | | | | | | | | 1 | | 3 | 5 | 0 | | 8 | 0 |

*Inventors*
Johannes Sobisch
August Krüger

PRINT DEVICE SHIFTING MEANS FOR EFFECTING INTERSPERSED PRINTING

Filed April 1, 1954 12 Sheets-Sheet 2

Inventors
Johannes Sobisch
August Krüger

April 9, 1957 J. SOBISCH ET AL 2,787,953

PRINT DEVICE SHIFTING MEANS FOR EFFECTING INTERSPERSED PRINTING

Filed April 1, 1954 12 Sheets-Sheet 3

Inventors
Johannes Sobisch
August Krüger

April 9, 1957 J. SOBISCH ET AL 2,787,953

PRINT DEVICE SHIFTING MEANS FOR EFFECTING INTERSPERSED PRINTING

Filed April 1, 1954 12 Sheets-Sheet 4

Inventors
Johannes Sobisch
August Krüger

April 9, 1957 J. SOBISCH ET AL 2,787,953

PRINT DEVICE SHIFTING MEANS FOR EFFECTING INTERSPERSED PRINTING

Filed April 1, 1954 12 Sheets-Sheet 5

Inventors
Johannes Sobisch
August Krüger

PRINT DEVICE SHIFTING MEANS FOR EFFECTING INTERSPERSED PRINTING

Filed April 1, 1954 12 Sheets-Sheet 6

Inventors
Johannes Sobisch
August Krüger

*Inventors*
Johannes Sobisch
August Krüger

*Inventors*
Johannes Sobisch
August Krüger

Inventors
Johannes Sobisch
August Krüger

Inventors
Johannes Sobisch
August Krüger

Inventors
Johannes Sobisch
August Krüger

Inventors:
Johannes Sobisch
and
August Krüger 2,787,953

PRINT DEVICE SHIFTING MEANS FOR EFFECTING INTERSPERSED PRINTING

Johannes Sobisch, Bielefeld, and August Krüger, Lockhausen, Kreis Lemgo, Germany, assignors to Anker-Werke A. G., Bielefeld, Germany, a corporation of Germany Application April 1, 1954, Serial No. 420,372

Claims priority, application Germany April 2, 1953

3 Claims. (Cl. 101—93)

Our invention relates to printing devices for business machines such as calculating machines, accounting machines, tabulating machines, or cash registers.

Known printing devices in machines of this type have a group of type carrying members arranged beside each other, each member being provided with a multitude of selectively operable type faces. For producing a well legible impression, each individual type member must have a certain minimum width in the alignment direction of the group. On the other hand, the type members must be sufficiently spaced from each other to produce a clean impression, such spacing being secured by an accurate guidance of the type members. In accordance with the mutual spacing of the type members, a corresponding length of the line of characters to be printed is required, and hence a correspondingly large width of the recording tape, journal sheet, check, or other voucher to be imprinted, as well as a corresponding width of the machine parts that accommodate such voucher. The advantage of such a printing device, compared with the typing mechanism of a typewriter where the successive operation of the individual type carrying levers permits an extremely narrow spacing of the characters, lies in the fact that the printing is done at a much greater speed since all characters are printed not successively but simultaneously and impact-wise in a single operation.

Relating to such printing devices with an aligned group of multi-type carriers, it is an object of our invention to make such devices capable of placing the printed characters as closely together as may be desired, thus permitting a reduction in the width of the vouchers or papers to be imprinted.

To this end, and according to a feature of our invention, we design and operate the group of type carriers in such a manner that, for printing a single line of characters, the carriers move repeatedly into the printing position thus completing the printed line only after a plurality of partial printing operations are effected; and we shift the print-receiving paper on its carrier in the line direction by the width of a character during the interim between these partial printing operations. By virtue of such a design and operation of the printing device, virtually any impression can be produced in which the individual characters remain optically discernible from each other.

If the spacing between two successive type carriers including their respective type faces is made twice as wide as the width of the individual type characters, then the spacing remaining between the two simultaneously imprinted characters on the voucher or sheet of paper is just large enough to insert an additional character by means of a second printing operation after a corresponding lateral displacement of the sheet. It follows that in this case each type carrier must twice reach the printing position and that the carrier of the paper sheet must be laterally displaced between the two printing operations a distance equal to one unit of spacing. These two successive printing operations or respective printing positions are hereinafter briefly referred to as "first printing" and "second printing" respectively. That is, when printing a multi-digit number, the first printing operation places an impression into the columns or digit positions 2, 4, 6 and so forth, while the second printing operation places an impression into the remaining digit positions 1, 3, 5 and so forth; or vice versa. The same operation will take place if a text composed of letters or of various characters (letters, numerals, punctuation marks, etc.) is to be printed. When the two-step printing operation is completed, the complete line of text is impressed upon the sheet with the desired narrow spacing between the individual characters.

It will be recognized that such a narrow-space printing operation in two steps requires more time than if the entire text is printed in the conventional manner by a single operation. However, the increased operating time is still very much smaller than that needed for typing a text with a typewriter mechanism and is still negligible or insignificant if the printing mechanism is wide enough to smultaneously imprint a plurality of character columns or when the business machine performs further operations, such as calculating or setting-up operations, while the printing operation is in progress. A salient advantage of a plural-step printing device according to the invention lies in the fact that a lesser number of type carriers is required in comparison with conventional printing devices of the same column capacity and, above all, that the paper sheet or voucher to be imprinted can be given a smaller width, thus permitting a corresponding reduction in the dimensions of the apparatus components for accommodating, feeding or guiding the sheet.

The foregoing and other objects, advantages, and features of our invention will be apparent from, or will be set forth in conjunction with, the following description of the embodiment illustrated on the drawings. The drawing illustrates an electrically operating printing device for a business machine. More specifically:

Fig. 1 is explanatory and presents a tabulation elucidating the two-step principle applied to the printing of a line of numerals.

*Printer assembly*

The operating principle of a printing device according to the invention for a two-step printing operation will best be understood from the schematic tabulation shown in Fig. 1, although this tabulation is not meant to represent the actually narrow spacing between adjacent characters. It is assumed that the printing device has a capacity of twenty unit spaces. That is, any individual text or number to be printed in two steps may occupy a line of up to twenty places, the illustrated being limited to the printing of decimal numbers. Assume that the complete impression to be produced is the number 1 350 80 (last horizontal row in Fig. 1). This number may represent the amount of $1,350.80 and, hence, is to be printed with blank spaces between the second and third digits and between the fifth and sixth digits as shown. During the first step of operation, the 2nd, 4th, 6th and 8th spaces are simultaneously imprinted by respective type carriers to produce the partial impression (first printing, see third horizontal row in Fig. 1):

1 3 0 8

Thereafter the 1st and 5th spaces are simultaneously imprinted by respective type carriers to produce the partial impression (second printing, see fourth horizontal row in Fig. 1):

5 0

This second step completes the operation and produces the desired total impression:

1 350 80

Figure 2:
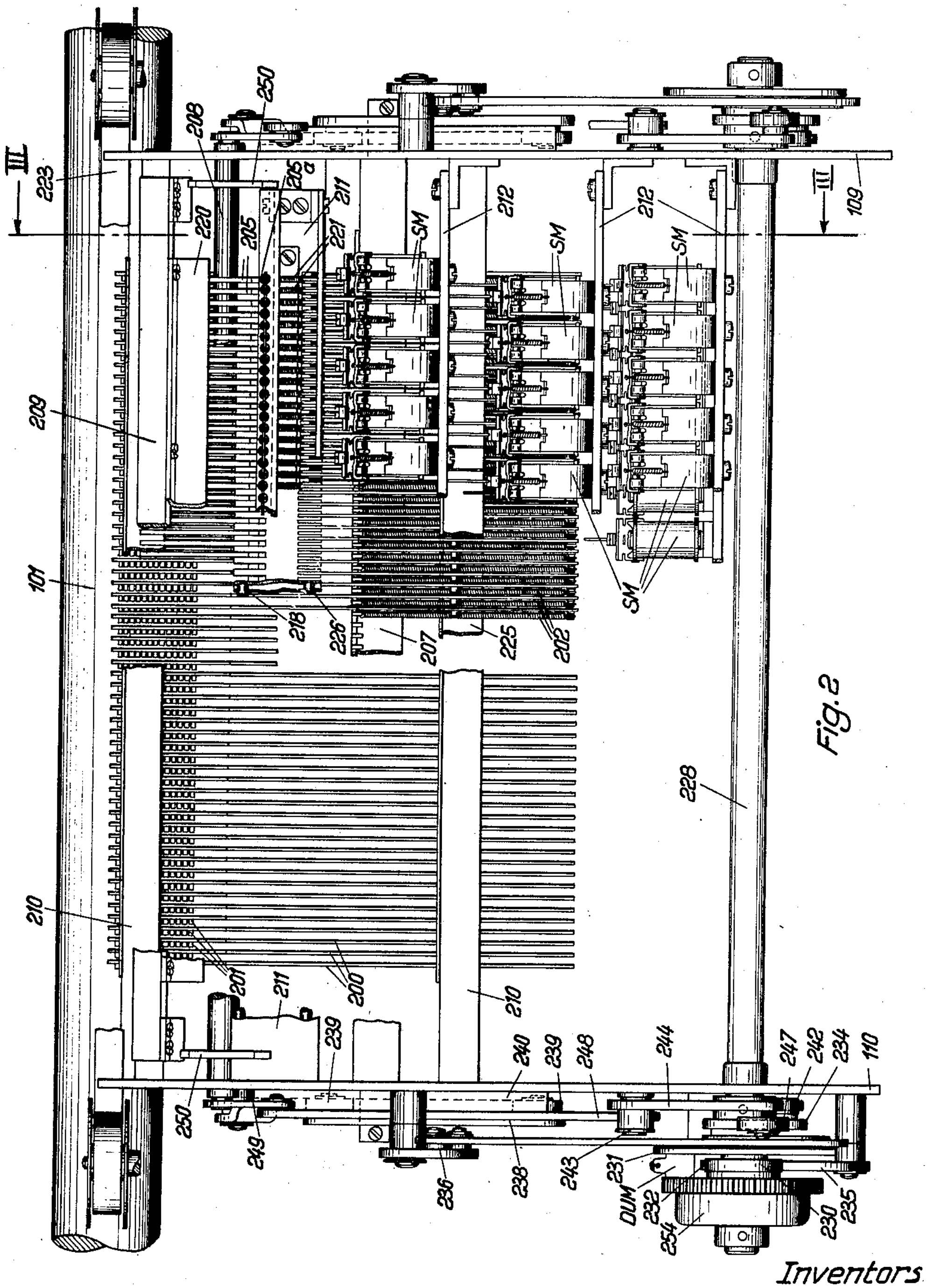
Fig. 2 is a front view of the printing mechanism partly in section, with groups of components removed.
Figure 3:
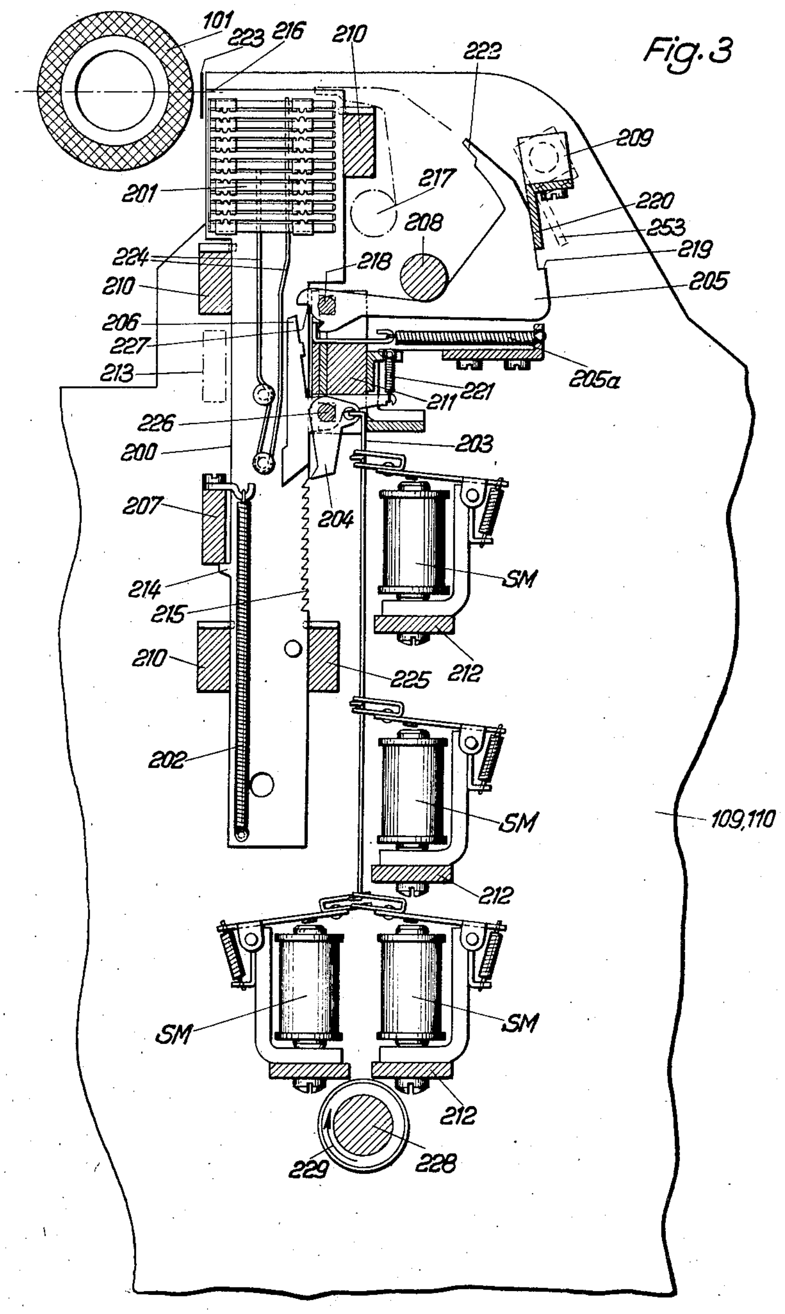
Fig. 3 is a lateral, sectional view of the printing device, the section being taken along the line III—III indicated in Fig. 2.

A printing device operating on this principle is illustrated in Figs. 2, 3, 4 and 14. The device comprises a number of type carriers 200 vertically displaceable in a group of guide combs 210 (Figs. 2, 3). Each type carrier 200 consists essentially of a flat and vertically elongated plate of sheet metal and carries in its upper portion a number of type bars 201. The type bars 201 extend horizontally in parallel relation to each other and are slidably secured to the carrier plate 200. Each type bar 201 carries a type face on its front end directed toward the side of the platen roller 101 (see Fig. 14). The particular type to be imprinted is selected by displacing the carrier plate 200 upwardly from the illustrated normal position to an elevation in which the type face to be selected lies in front of the platen roller.

The setting of the type carrier plates 200 to the proper elevation is effected by means of respective stop magnets SM arranged in four rows (Fig. 3). Each carrier plate 200 has a rack portion 215 engageable by a stop pawl 204 stationarily pivoted at 226. Each carrier plate 200 is biased by a pull spring 202 whose lower end is linked to the carrier plate while the upper end is fastened to a lifting bar 207. The armature of each stop magnet SM is linked by a pull wire 203 with the stop pawl 204 so that the pawl will enter into the operative range of the rack portion 215 of carrier plate 200 only when the stop magnet SM is energized. An individual printing hammer 205, pivoted at 218, is correlated to each of the type carriers and is engageable by a latch 206. The lifting bar 207 (Figs. 2, 3) is common to all sets of type carriers. All sets of type carriers have further in common a bar 208 for tensioning the printing hammers 205, a printing-hammer interlock 209, and the group of guide combs 210. The guide combs 210 are firmly secured between the lateral walls 109 and 110 of the machine frame structure. Also secured to these main walls 109, 110, is a supporting bar 211 for the printing hammers 205 and latches 206, as well as a number of bars 212 that carry the locking magnets SM. The main walls 109, 110 also support the control means for lifting bar 207, the control means for the printing-hammer tensioning bar 208, the control means for the printing-hammer locking device, and also a distributor DSW (see Fig. 4) of the selector-switch type, these components being more fully described in the following:

For initiating the printing operation, the lifting bar 207 moves from its normal position shown in Fig. 3 to the position indicated in the same figure by broken lines at 213. The type carriers 200, biased by the respective springs 202, follow the upward movement of the lifting bar 207 while a stop nose 214 of each type carrier 200 remains in abutment against the bottom edge of the lifting bar. If, at a given moment during the upward movement of the type carrier, the pertaining one stop magnet SM is energized, the stop pawl 204 moves its tip into the rack portion 215 of the type carrier and thus stops the further upward movement of that particular carrier. The lifting bar 207, however, may continue its upward movement while tensioning the spring 202. The type carrier 200, when thus stopped, has reached a position in which a given one of its type bars 201 has the elevation of the printing line 216. This one type bar 201 is thus determined by the moment at which, during the upward travel of type carrier 200, the tip of pawl 204 enters into engagement with a tooth front of the rack portion 215.

After the lifting bar 207 has reached its uppermost position 213, the printing hammer tensioning bar 208 moves to the position shown by a dotted line in Fig. 3 at 217. All printing hammers 205 are pivoted in slots of the supporting bar 211 and are journalled about a common pivot pin 218 which traverses all slots. Each printing hammer is biased by a tensioning spring **205*a* tending to turn the hammer counterclockwise (Fig. 3). When the tensioning bar 208 moves, all printing hammers 205 follow part of the movement until a stop face 219 of each hammer abuts against the bar 220 of the printing-hammer locking device 209. Shortly thereafter the locking device is turned out of the range of the printing hammers so that the hammers, under the pull of respective springs 205*a*, fling forward. The tips 222 of the printing hammers then hit against those type bars 201 that then occupy the printing position. The type face then produces an imprint on a sheet of paper passing around a platen roller 101, an inking ribbon 223 being disposed between the type carrier and the platen roller. The platen roller 101** is mounted on a paper-guiding carriage assembly that performs the above-mentioned lateral shifting movement in the direction of the line of printing. Details of the carriage assembly and its control are described in a later place with reference to Figs. 9 to 12.

After the return movement of the printing hammers, the type bars, biased by springs 224, return to the normal position. The lifting bar 207 also returns to the original position and moves all type carriers 200 downward to the position of rest shown on the drawings.

If during the adjusting operation above described, a type carrier while moving upwardly along with a lifting bar 207 is not stopped by the pertaining stop pawl 204 because this type carrier is not supposed to produce an impression, then a pin 225 riveted to the carrier 200 abuts against the lower edge of the latch 206. All latches 206 are journalled in respective slots of the supporting bar 211 and are rotatable about a pivot pin 226 passing through the respective slots. The latch 206 for each type carrier is biased by a spring 221 for clockwise movement (Fig. 3) about the pivot pin 226. The latch 206 of each type carrier cooperates with the pertaining printing hammer 205. When the pin 225 engages the lower edge of latch 206, the top end of the lever enters into a recess 227 of the printing hammer 205, thus preventing the hammer from swinging in counterclockwise. Consequently, when the printing hammers are being released by the locking device 209, those hammers that are caught by the respective latches 206 cannot follow the pulling force exerted upon them by the respective springs 205*a*. This latching of the printing hammers not to operate considerably contributes to reducing the noise of the printing operation.

Figure 4:
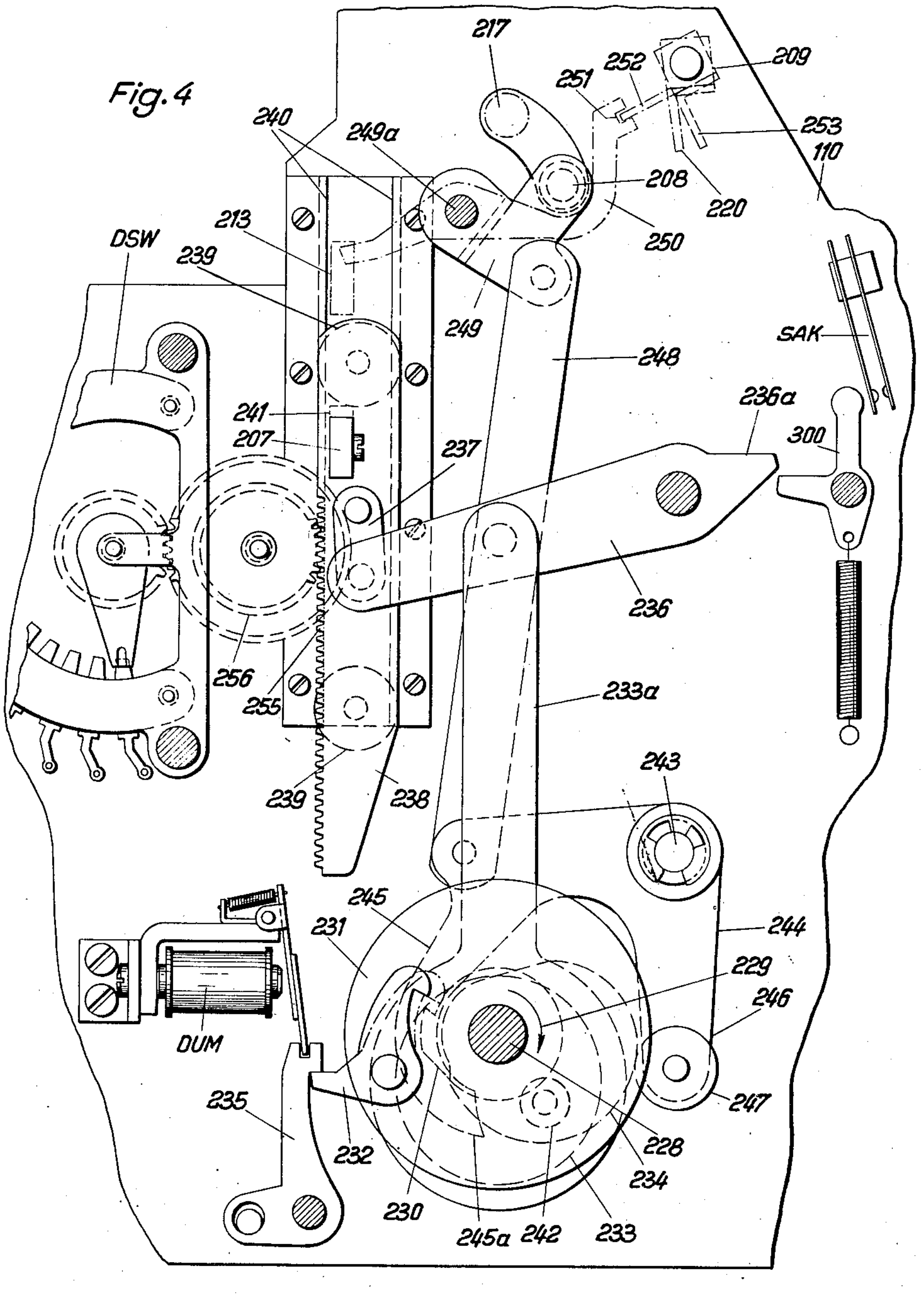
Fig. 4 is a lateral view of the printing device taken from the left of Fig. 2 and showing particularly the means for driving the printing device.
Figure 12:
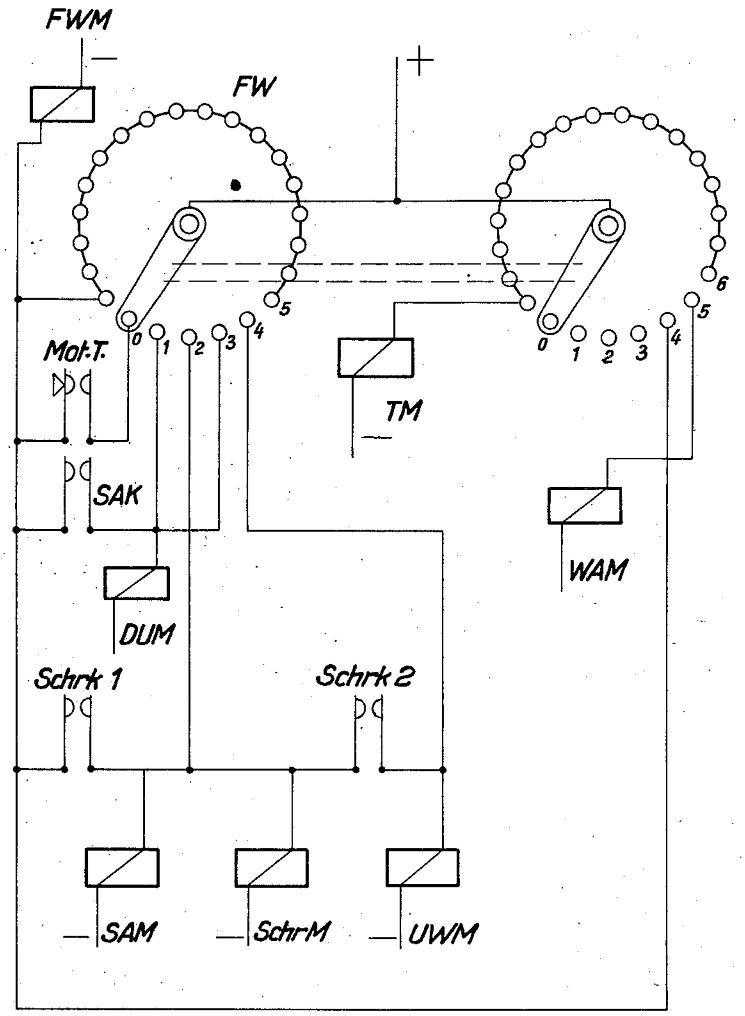
Fig. 12 is a schematic electric circuit diagram of the same apparatus.

Fig. 4 shows the distributor switch DSW as well as the mechanisms for driving the lifting bar 207, the printing-hammer tensioning bar 208 and the printing hammer locking device 209. A shaft 228 (Figs. 2, 3, 4) is journalled in the two main walls 109, 110 of the machine frame and is coupled with the main drive of the machine so as to revolve continuously in the direction of the arrow 229. A cam 230 is firmly mounted on shaft 228. A disc 231 loosely seated on the same shaft carries a pawl 232. An eccentric 233 and a cam disc 234 are firmly joined with cam 231. The eccentric 233 cooperates with a rod 233*a*. The pawl 232 is located in the plane of the cam nose 230 and is normally kept out of the range of engagement of rotating nose 230 by means of a latch 235. Latch 235 is pivoted to the wall 110 and is controlled by an electromagnet DUM (Figs. 2, 4, 12). When magnet DUM is excited, its armature releases the latch 235 (Figs. 2, 4) from pawl 232 so that the pawl, under the bias of a torsional connecting spring (not illustrated) moves into the range of rotation of nose 230. Nose 230 engages the active tip of pawl 232 and thereby entrains the pawl 232 and hence the disc 231 on which the pawl is mounted. After completing one full revolution, the latching arm of pawl 232 is again caught by the latch 235 provided the magnet DUM is deenergized at that moment.

During the rotation of the printing-mechanism drive, the eccentric members 233, 233*a* displace a swing lever 236 pivotally mounted on the main wall 110. Lever 236 is joined by a link 237 with a guide beam 238 which is moved upwardly by the movement of the swing lever. The guide beam 238 carries two rollers 239 with which it is guided between two rails 240 mounted on the main walls 109, 110. The lifting bar 207 passes through a slot 241 of the guide beam 238 so that the lifting bar moves up together with the guide beam.

The rotating curve disc 234 carries a roller 242. A lever 244 pivotally mounted on the main wall 110 by a pivot pin 243 has an extension 245 whose tip 245*a* is located in the path of the roller 242 so that the lever 244 can be swung out in a clockwise direction about the pivot pin 243 when the extension 245*a* is engaged and entrained by the roller 242. Shortly before the curve disc 234 terminates its rotation, it displacves the roller 247 and thereby forces the lever 244 back into the normal position shown in Fig. 4. The rotating movement of lever 244 is transmitted by a link 248 to the lever 249 which is pivotally mounted at 249*a*. Secured to the lever 249 is the printing-hammer tensioning bar 208 which projects through slots in the main walls 109, 110 (see Fig. 2). The tensioning bar 208 thus effects the release of the printing hammers for movement toward the position 217 shown by a dot-and-dash line (Fig. 3) and, during its return movement, places the printing hammers back into normal position. Two levers 250 (Figs. 2, 4) are pivotally mounted on the inner sides of the respective main walls 109, 110 on a pivot pin 218 (see Fig. 3). The levers 250 are guided in slots of the supporting bar 211 (Fig. 2). Each of levers 250 has a recess 251 straddling a projecting member 252 of the printing-hammer locking device 209. When the lifting bar 207 moves, it abuts against the two levers 250 shortly before reaching the uppermost position, thus turning the levers 250 clockwise (Fig. 4). As a result, the printing-hammer locking device 209 is turned into the position 253 indicated by broken lines (Fig. 4), and the rail 220 passes out of the range of the printing hammers thus releasing them for printing operation. The lifting bar 207 when returning to the lowermost position, permits the hammer-locking device 209 to return to its normal position under the pulling force of a spring (not illustrated).

To prevent irregularities, particularly an overshooting motion when the printing mechanism is being driven by the springs 202 (Figs. 2, 3), a free-wheeling coupling 254 (Fig. 2) of conventional design is interposed between the continuously revolving drive and the single-turn drive of the printing mechanism. By virtue of this coupling, the velocity of the single-turn revolution of the printer drive, in any position thereof, cannot become greater than the velocity of the continuously revolving shaft 228.

The guide beam 238 (Fig. 4) has one of its lateral, vertical sides designed as a rack 255. This rack meshes with a spur gear of an intermediate transmission 256 that drives the contact arm of the distributor switch DSW (Figs. 2, 4). The switch arm, therefore, moves in synchronism with the movement of the lifting bar 207. This means that one of the respective bank contacts of distributor switch DSW is just being engaged by the switch arm when a tooth of the rack portion 215 on type carrier 200 passes by the tip of pawl 204.

The drive mechanism for the lifting bar, for the hammer-tensioning device and for the hammer-locking device are symmetrically arranged on the two side walls 119, 110. The free-wheeling coupling 254, the distributor DSW and the printer control magnet DUM with the pertaining link members are required only once and hence are mounted only on the side wall 110.

The electric control of the type carriers for placing the selector type faces onto the printing line is effected as follows:

The numerals, letters or other characters to be printed are put into the machine by means of a keyboard or other setup device as customary in business machines. Such a set-up device is schematically shown at 1 in Fig. 5. In its simplest design, the setting device consists of a cross-bar distributor formed by two systems of contact bars that extend in perpendicular relation to each other and are electrically insulated from each other. At any one of the multitude of intersections between the two systems of contact bars a conductive connection can selectively be established so that any contact bar shown vertically can be connected with any one of the horizontal contact bars. It is not essential for the present invention how, in particular, such a selective connection is brought about; it will suffice, for fully explaining and understanding the invention, to assume that each desired connection is simply made, for instance, by a contact plug, although more elaborate set-up means of greater speed may be used such as the one disclosed and claimed in our co-pending application, Serial No. 390,069, filed November 3, 1953, and assigned to the assignee of the present invention.

Figure 5:
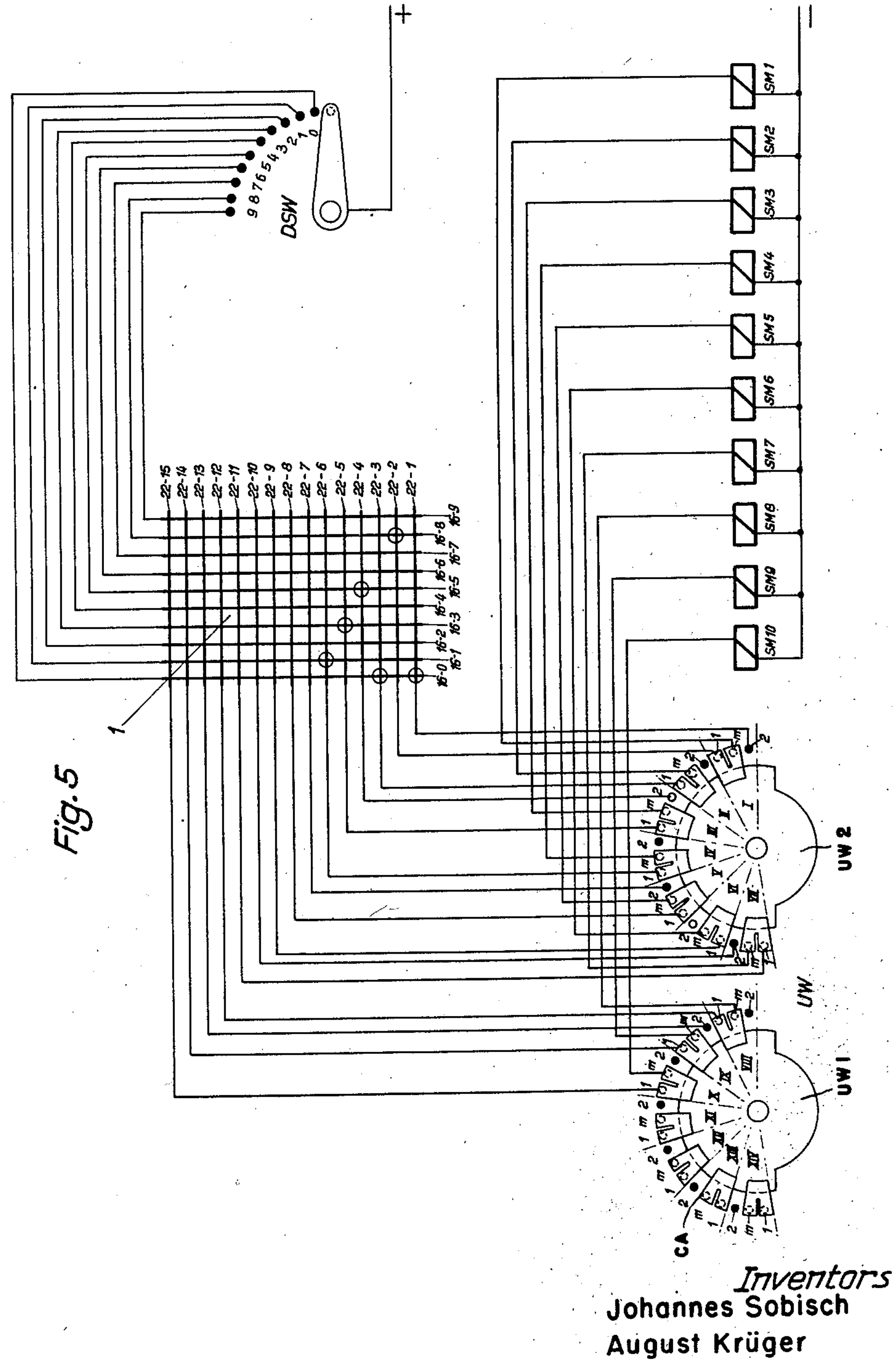
Fig. 5 is a schematic electric circuit diagram relating to the same printing device, and designed for double-printing operation.

In Fig. 5 the cross-bar set-up device 1 comprises the vertical bars denoted by 16–0 to 16–9, and the horizontal contact bars 22–1 to 22–15. The conductive connection between the bars is schematically represented by a circle about a point of intersection. The bars 16–0 to 16–9 represent the characters keyed or otherwise entered into the machine, these characters being the numerals 0 to 9 in the illustrated case. The contact bars 22–1 to 22–15 indicate the sequence in which the characters are set up. That is, the example represented in Fig. 5 shows a setup that denotes the same sequence of numerals 1 350 80 as shown in Fig. 1.

As shown in Fig. 5, the bank contacts of distributor switch DSW (see also Figs. 2, 4) are electrically connected with the respective vertical contact bars 16–0 to 16–9. The contact arm of the switch DSW is connected to the positive bus of a current supply line.

The circuit system according to Fig. 5 further comprises a control switch UW. This switch has two rotatable parts UW1 and UW2, for instance of insulating material, that are mounted on a common shaft (not shown) so as to rotate as a single unit. Each of the two parts carries a number of contact arms, such as the one denoted by CA; and each of these arms is assigned to one of a number of respective sectors identified by Roman numerals I to XIV. Each contact arm cooperates with three stationary bank contacts designed as contact pins which, for each sector, are denoted by 1, M, 2 respectively. In the illustrated normal position of switch UW, each active contact arm connects the appertaining bank contact in with the adjacent bank contact 1, while the bank contacts 2 remain unoccupied. When the control switch UW is turned clockwise by one contact division, the contact arms connect the contact pins in with the respective contact pins 2 while the contacts 1 are now free, that is, in the normal position of the selector arms. The various bank contacts of control switch UW are hereinafter identified, with reference to the corresponding sectors, as $I_1$, $I_m$, $I_2$, $II_1$, $II_m$, $II_2$, III, and so forth.

For the purpose of further explanation, it may be assumed that the selector UW is in its normal position for the duration of the above-described first printing operation, and the selector is turned clockwise by one division after the first and prior to the second printing operation. After completion of the second printing operation, the selector UW returns back to its normal position. The drive means for the selector UW are not further illustrated because it is unessential for the invention how the change in adjustment is brought about. The circuit diagram of Fig. 5 also shows ten magnets SM1 to SM10. These magnets are identical with the stop magnets generally denoted by SM in Figs. 2 and 3. Consequently, the circuit diagram of Fig. 5 shows a control for ten type carriers.

*Carriage assembly*

Figure 9:
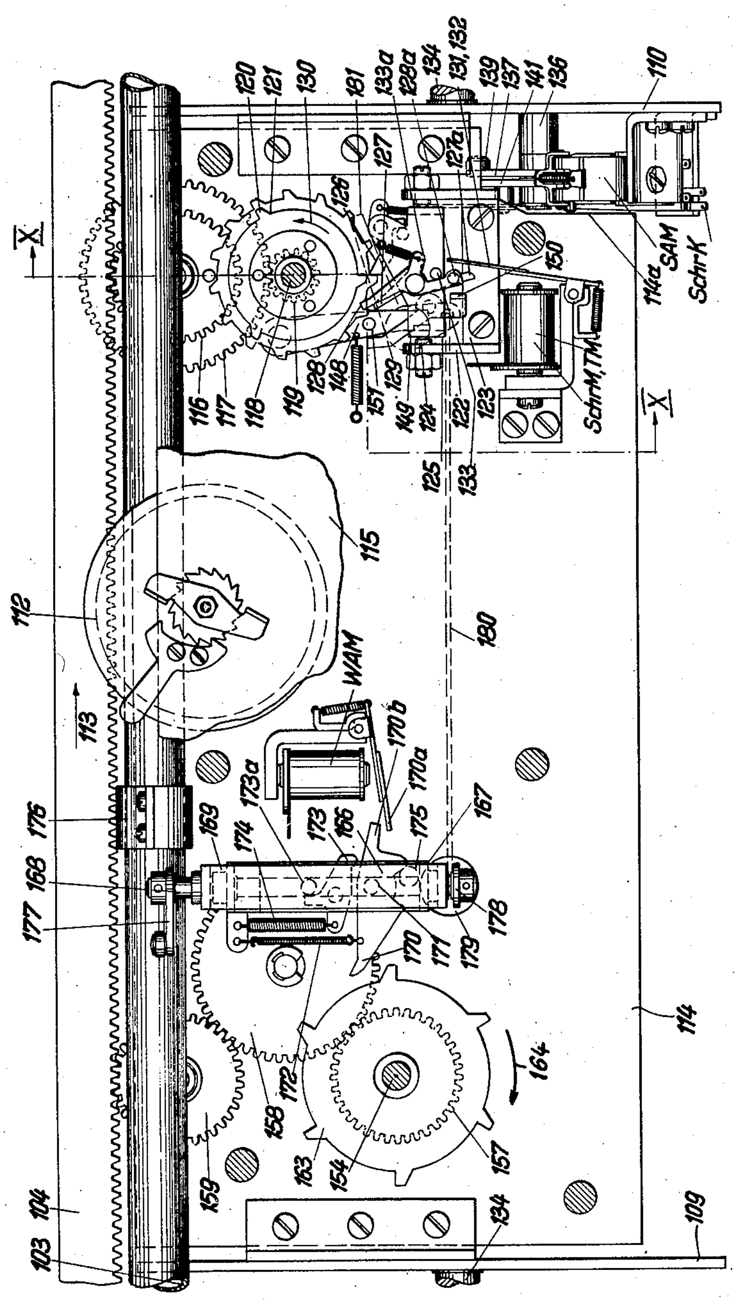
Fig. 9 shows the paper transporting apparatus of a printing device according to Figs. 2 to 5 or Fig. 9.
Figure 10:
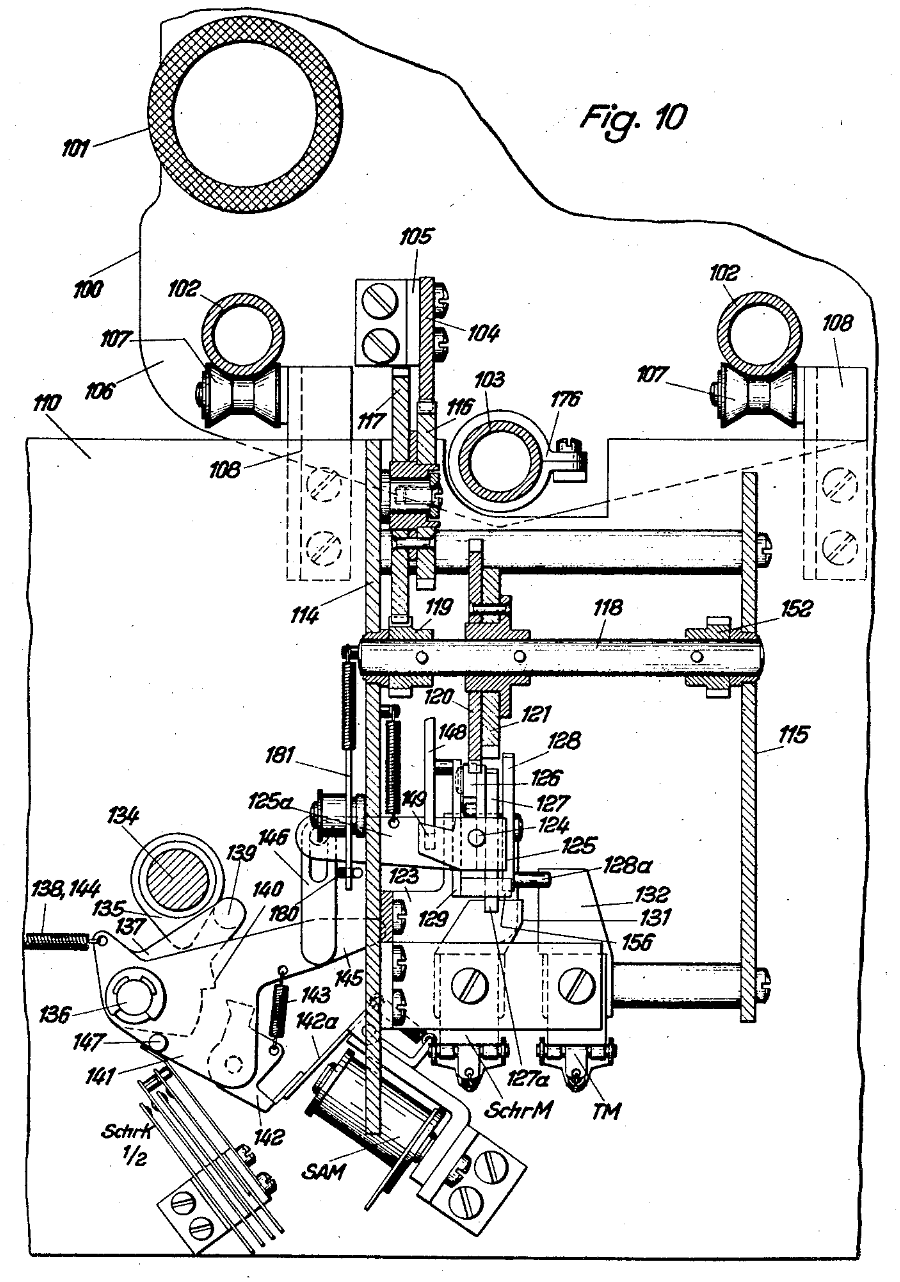
Fig. 10 is a cross section along the line X—X in Fig. 9.
Figure 11:
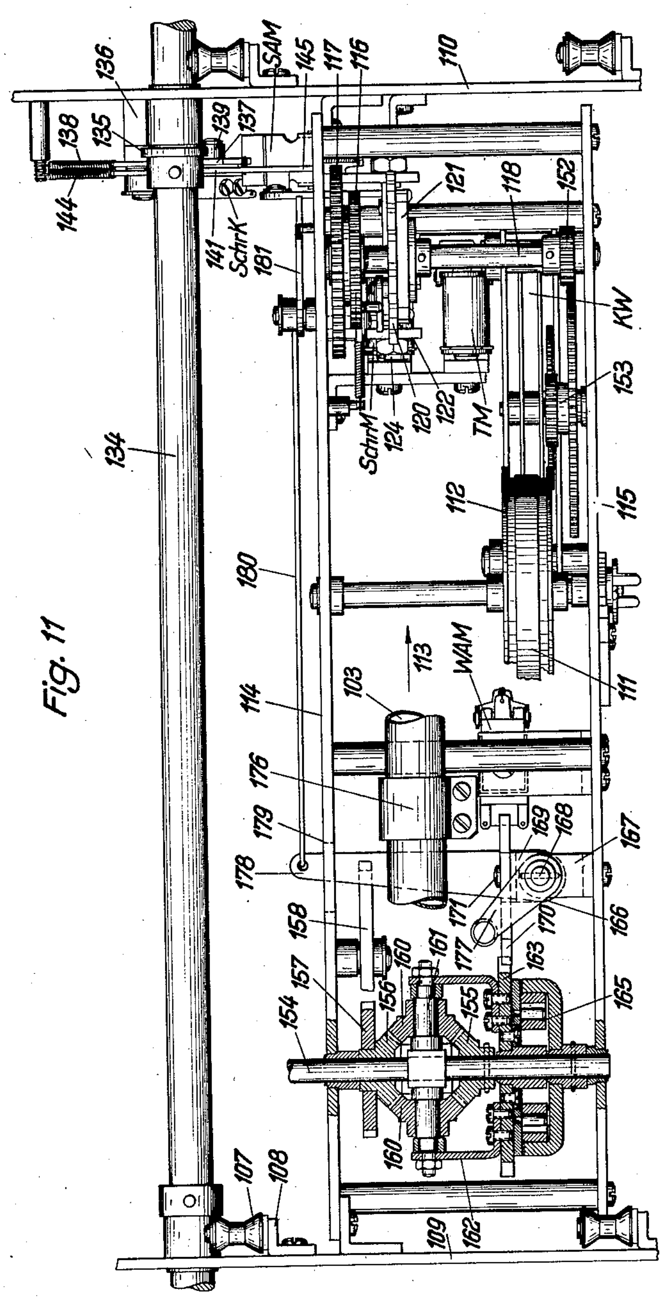
Fig. 11 is a top view of the apparatus shown in Figs. 9 and 10.

As mentioned, the platen roller 101 is mounted on a carriage. This carriage, denoted by 100 (Fig. 10) is suspended from tubular rods 102 and 103 slidably supported on rollers 107 (Figs. 10, 11). The rollers 107 are journalled on angle pieces 108 firmly secured to the main walls 109, 110 of the machine. A rack 104 (Figs. 9, 10) is fastened by angle pieces 105 to the side walls 106 of the carriage.

The carriage is continuously subjected to pulling force through a steel tape 111 (Fig. 11) attached to a pull spring coiled up in a spring housing 112 (Figs. 9, 11), this mechanism being similar to the spring drive generally used in typewriters. The spring shifts the carriage in the direction of the arrow 113 (Fig. 9) unless the carriage is prevented from moving in the manner described below.

Two partition plates 114, 115 (Figs. 9, 10, 11) extend perpendicularly to the main walls 109, 110 of the machine frame and are firmly joined therewith. The plates 114, 115 serve to accommodate the carriage-shift control devices. A spur gear 116 is journalled on plate 114 and is in meshing engagement with the rack 104. Another spur gear, firmly joined with gear 116, meshes with a pinion 119 rigidly pinned to a shaft 118 that is journalled between the two wall plates 114 and 115. Due to the gear connection just described, a shifting movement of the carriage causes the rack 104 to transmit revolving movement to the shaft 118.

Firmly pinned to the shaft 118 are two escapement gears 120 and 121. Gear 120 has fifteen teeth. Gear 121 has only three teeth located adjacent to each fifth tooth of gear 120.

The escapement gears 120 and 121 cooperate with a shift control mechanism 122. This mechanism comprises a bearing bracket 123 firmly attached by screws to wall plate 114, a pair of adjustable pivot pins 124 screwed into the bracket 123 in coaxial relation to each other, an escapement control bridge 125, and two electromagnets *Schr*M and TM.

The control bridge 125 of the escapement mechanism carries three detents 126, 127, 128 and a releasing lever 129. The bridge 125 is rotatable about the pivot pins 124. In the normal position of bridge 125 (Fig. 10), the detent 126 lies in the plane of the escapement gear 120 so that this gear cannot rotate in the direction of the arrow 120 (Fig. 9) because one of its teeth abuts against the detent. The detent 127 cooperates with the escapement gear 120, and the detent 128 cooperates with gear 121. In the normal position of the bridge 125, the detents 127 and 128 are outside of the plane of the respective gears 120 and 121.

When the control bridge 125 is being swung out of the normal position, the detent 126 moves out of the range of gear 120, and the detents 127 and 128 now enter into the plane of respective gears 120 and 121. However, the detents 127 and 128 still remain ineffective because they do not project into the rotating range of the escapement gears. The release of detent 126 from escapement gear 120 causes the carriage to start moving under the force of the pull spring. The gears 120, 121 then rotate together with the carriage travel until either the magnet *Schr*M or the magnet TM is energized. When the magnet *Schr*M is energized, it turns the detent 127 into the rotating range of the escapement gear 120. When the magnet TM is energized, it turns the detent 128 into the rotating range of the escapement gear 121. For this purpose, the armatures of these two magnets carry respective sheet-metal parts 131, 132 (Fig. 10) which hit against extensions **127*a*, 128*a* of the respective detents 127, 128, thus moving the detents into the rotating range of the escapement gears. The next adjacent tooth of the gear then engages the detent 127 or 128 and turns it until an extension 133*a* of the detent abuts against a stop pin 133 of the bridge 125 (Fig. 9). After the magnet becomes again deenergized, the slightly slanting shape of the escapement teeth and detents at the place of mutual engagement causes the detent 127 or 128 to move laterally out of the plane of the escapement gear, thus returning the escapement control bridge 125 back to its normal position. As a result, the detent 126 places itself in front of the one tooth of escapement gear 120 that corresponds to the then obtaining rotary position of the gear set 120, 121. This stops the revolving movement of shaft 118**, the platen-roller carriage with the sheet of paper has now shifted to a new position and remains temporarily arrested in that position.

The above-mentioned swinging-out movement of the escapement control bridge 125 for initiating a shift of the carriage is brought about as follows:

A shaft 134 (Figs. 10, 11), journalled between the main walls 109, 110 of the machine frame, is continuously connected with the main drive of the machine and is kept in continuous revolution as long as the apparatus is in driving condition. Drive shaft 134 carries a cam 135. A pivot pin 136 mounted on wall 110 carries a cam follower 137 and a releasing lever 141. The cam follower 137 has a roller 139 continuously biased into engagement with the cam 135 by means of a pull spring 138, so that the cam follower 137 performs a swinging movement during a full revolution of cam 135.

The releasing lever 141 carries a pivotally mounted entrainer pawl 142 biased by a spring 143 so that the tip of the pawl tends to enter into engagement with a stop 140 formed by a shoulder of the cam follower 137. A spring 144 urges the releasing lever 141 counterclockwise (Fig. 10) so that an extension 145 of lever 141 abuts against a stop formed by a recess **114*a* in wall plate 114 (see Fig. 9). The armature 142*a* of a shift-release magnet SAM normally prevents the pawl 142 from engaging the cam follower 137. Consequently, the releasing lever 141 remains at rest until voltage is applied to the magnet SAM. Then the armature 142*a* is attracted away from the entrainer pawl 142, the pawl enters into engagement with the stop shoulder 140 of the cam follower 137 so that the pawl 142 and the releasing lever 141 are entrained when the cam follower 137 performs a swinging movement under control by the cam 135**.

In this manner, a single cycle of swinging movement is imparted to the releasing lever 141. Since the magnet SAM is each time energized for an only short interval, its armature **142*a* can immediately place itself into latching engagement with the entrainer pawl 142 as soon as the release lever 141 swings back in the upward direction. The latching engagement of armature 142*a* and pawl 142 then causes the pawl to swing out of the range of the cam follower. As a result, the release lever 141** performs only one downward movement and thereafter returns back to its normal position.

A link 146 (Fig. 10) joins the release lever 141 with the escapement control bridge 125 in order to release the carriage-shift movement already described. During the movement of the releasing lever 141, a pin 147 of this lever closes an electric contact device S*chr*K whose functioning will be explained in a later place.

When swung out from its normal position, the escapement control bridge 125 remains in this position because a spring-biased latch 148 pivoted on the wall plate 114 now abuts against a lug 149 of the bridge 125 (Fig. 10). A return of the bridge 125 to its normal position is possible only when the release lever 129 of the escapement control mechanism (Fig. 9) is moved clockwise by the detent 127 or 128. The detents of the escapement mechanism are urged against a lug 150 of the release lever 129 due to the fact that the carriage-driving pull spring acts upon the detents through the teeth of the escapement gears 120, 121. The release lever 129 stresses against the pin 151 of the latch 148 which then releases the lug 149 and thus permits the bridge 125 to return to its normal position.

The platen carriage is returned to its normal position by means of a wind-up drive, a cross section of this drive being illustrated in Fig. 11. The drive is essentially of the differential-gear type. Its main drive shaft 154 is connected with the drive of the business machine and revolves continuously. A bevel gear 155 is pinned to drive shaft 154 to revolve together therewith. An oppositely-located bevel gear 156 is loosely seated upon the shaft 154 and hence does not normally revolve. Firmly joined with bevel gear 156 is a spur gear 157 meshing with intermediate gears 158, 159 (Fig. 9) that connect the spur gear with the rack 104. The two other bevel gears 160 of the differential gearing are freely revolvable on a shaft 161 which is likewise loosely seated on the main shaft 154 of the drive. When the carriage and hence the bevel gear 156 are at rest while the main shaft 154 with bevel gear 155 are revolving, the differential shaft 161 revolves about the main shaft at one half the angular speed of the main shaft.

This rotating movement of the differential shaft 161 is imparted by two brackets 162 to a ratchet gear 163 (Figs. 9, 11) loosely seated upon the main shaft 154. Ratchet gear 163 revolves in the same direction as the main shaft 154, this direction being indicated by an arrow 164.

When the carriage shifts forward according to the arrow 113 (Figs. 9, 11), the angular speed of differential shaft 161 and ratchet gear 163 increases. A free-wheeling coupling 165 of conventional design limits the running speed of the carriage by preventing the ratchet gear 163 from assuming higher speed of revolution than the main shaft 154.

However, when the ratchet gear 163 is prevented from revolving, then the bevel gear 156 is constrainedly driven to revolve in opposition to the revolving direction of the main shaft 154. This moves the platen carriage in opposition to the direction indicated by the arrow 113; that is, the driving spring for the carriage is wound up. This winding-up operation is effected by means of the latching device 166 (Figs. 9, 11).

The latching device 166 is mounted on a bearing bracket 167 firmly secured to the wall plate 115 which also carries a carriage wind-up magnet WAM. Mounted on the bracket 167 is a pivot shaft 168 on which a detent carrier 169 is rotatable. A stop and a spring (not illustrated) normally maintain the detent carrier 169 in the position of rest shown in Fig. 11.

A detent 170 is pivoted on carrier 169 by means of a pivot pin 171. A relatively weak spring 172 (Fig. 9) keeps the tip of detent 170 outside the range of engagement with the teeth of the ratchet 163.

Also mounted on the detent carrier 169 is a rotatable stop pawl 173. Pawl 173 is normally kept in abutment with a stop 173 by the pull force of a comparatively strong spring 174.

When the magnet WAM is excited, its armature **170*a* hits against an extension 170*b* of the detent 170. This places the tip of detent 170 into the rotating range of the ratchet teeth of gear 163, while the back of detent 170 is moved against the stop pawl 173. The next following tooth of the rotating ratchet gear 163 entrains the tip of detent 170 and swings it downward until the detent 170 is stopped by a stop pin 175. At the same time, the back portion of detent 170, moving upwardly, imparts counterclockwise motion (Fig. 9) to the stop pawl 173. This puts the strong spring 174 under tension, thus securing a braking of the ratchet gear 163**. This has the result that the platen carriage starts moving without impact.

Mounted on the tubular rod 103 of the platen carriage is an adjustable clamp 176 (Figs. 9, 11). When the carriage approaches the normal poistion of rest, the clamp 176 presses against a roller-carrying lever 177 firmly secured to the shaft 168. Shaft 168 revolves and thus rotates the detent carrier 169 pinned to the shaft. This moves the detent 170 laterally out of the rotating range of ratchet gear 163. The ratchet gear can again rotate, and the wind-up drive is uncoupled. Pulled by springs 172, 174, the detent 170 again resumes its normal postion on the detent carrier 169.

Simultaneously with the revolution of shaft 168 by the lever 177, a lever 178 rigidly secured to shaft 168 performs a swinging movement. Lever 178 passes through an opening in the wall plate 114. A pull wire 180 transmits the movement to a lever 181 pivoted on the opposite side of wall plate 114 (Figs. 9, 10, 11). Lever 181 abuts against an arm **125*a* of the escapement control bridge 125, which arm also passes through an opening of plate 114. Arm 125*a* is thus swung counterclockwise. After the platen carriage, upon uncoupling of the wind-up drive, has been braked to standstill by the carriage spring, the carriage has slightly overshot its normal position and commences to run forward under the force of the pull spring. The detent 128** then moves into position to stop the carriage in the normal position.

The electric control for securing these operations is shown in Fig. 12. An operation selector for controlling the entire machine is schematically indicated at FW. This selector is shown as a twin-bank switch. Five contacts (1 to 5) in each bank are assigned to the control of the platen carriage. The control device further comprises a shift-release contact SAK controlled by an angular lever 300 (Figs. 12, 4) so as to close when the lever 300 turns clockwise. Fig. 12 also shows the four magnets of the carriage assembly: SAM, S*chr*M, TM, WAM. The contact *SchrK* is controlled by the releasing lever 141 (Fig. 10) already described. A stepping magnet FWM operates the selector FW. A motor-control key MT serves to start the machine operation now to be more fully explained.

*Operation*

The operation of the machine as a whole is as follows:

After the characters (values) to be printed are put into the set-up device 1, the machine operation is released by actuation of the motor control key as usual. This applies voltage to the stepping magnet FWM of a function-selector switch FW (Fig. 12) still to be described. Switch FW then moves one step from zero to first position and closes an energizing circuit for the printer-drive control magnet DUM (Figs. 12, 4). This causes the printer drive to be coupled with a continuously revolving drive shaft 228. As a result, the lifting bar 207 (Figs. 2, 3, 4) moves up and causes the distributor switch DSW to rotate its contact arm progressively while the type carriers 200 are following the upward movement of the lifting bar. During this motion, the contact arm of distributor DSW glides over the bank contacts co-related to the characters 0, 1, . . . 9. During this operation, when the bank contact 0 is thus engaged, an electric circuit is closed (Fig. 5) from the positive bus of the current supply through bank contact 0 of distributor DSW, contact bar 16–0, intersection of bar 16–0 with bar 22–3, contact $II_1$ in selector UW, contact $II_m$, and through the magnet SM2 to the negative bus of the current supply. The stop magnet SM2 is exited in this circuit.

As explained, when the contact arm of distributor DSW engages the bank contact 0, as is here the case, the rack portion 215 of each type carrier 200 is so positioned that when a stop pawl 204 enters into the rack teeth (Fig. 3), the type face corresponding to the character 0 is just positioned on the elevation of the printing line 216. Consequently in the example here considered, the second type carrier 200 is arrested by means of its stop magnet SM2 so as to be set for the printing of the character 0 (see also Fig. 1).

Corresponding settings for the first printing operation are given to the other type carriers during the further course of movement of the contact arm in distributor DSW. The printing operation is then concluded by the above-described release of the printing hammers 205.

Figure 14:
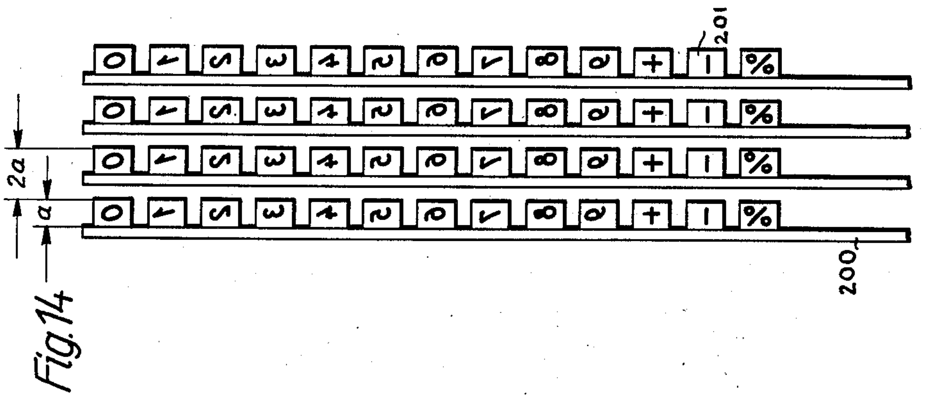
Fig. 14 shows the arrangement of the type carriers for printing a numerical series in two stages wherein the spacing between two successive carriers is twice as wide as the width of the individual type carriers.

Thereafter, the selector UW is turned clockwise one step, the platen-roller carriage with the sheet of paper being imprinted shifts laterally a distance corresponding to the width of one character (the distance "*a*" in Fig. 13), and the second printing operation is initiated by renewed excitation of the printer-control magnet DUM. Since the distance between two successive type carriers is equal to 2*a*, as can be seen in Fig. 14, the successive characters are printed adjacent one another, without the usual additional spacing heretofore found in matter printed by the use of a group of type carriers each having a number of selectable characters. These operations come about as follows:

When, at the end of the first printing operation, the guide beam 238 (Fig. 4) moves back to its normal, lowered position, a nose **236*a* on lever 236 actuates the bellcrank lever 300 which closes the contact SAK (Figs. 4, 12). Contact SAK applies voltage to the magnet FWM of the function-selector switch FW (Fig. 12), thus placing switch FW into its second position. This causes the shift release magnet SAM to be temporarily energized and to attract its armature. The escapement control bridge 125** (Fig. 10) is swung out counterclockwise as described above so that the platen carriage starts moving. The contacts S*chr*K1 and S*chr*K2, actuated by the releasing lever 141, apply voltage to the magnet S*chr*M which moves the detent 127 of the escapement mechanism into the active range of escapement gear 120. The gear 120 is stopped, and the carriage, having moved one step, is arrested in this position. The switching magnet UMW, simultaneously energized by the closing of contact S*chr*K, switches the selector UW one step ahead (Fig. 5); while magnet FWM receives voltage through contact S*chr*K1 and shifts the selector FW to position 3. Now the printer-drive control magnet DUM is again energized and initiates the second printing operation. The lifting bar 207 again commences its upward movement, and the other sequence of operations already described will again take place.

During the second rotation of the distributor DSW, the following circuit, again described only for the printing of the character 0, is in operation, the circuits for the other characters being analogous. From the positive bus the circuit extends through the bank contact 0 of distributor DSW, bar 16–0, bar 22–1, contact $I_2$ of selector UW, contact $I_m$, and through magnet $SM_1$ to the negative bus of the current supply. Magnet $SM_1$ is energized and the first type carrier 200 is stopped in the position required for the printing of the character 0. Consequently during the second printing operation, the character 0 is printed by the first type carrier (see also Fig. 1).

It may be mentioned at this place that it is possible to insert blank spaces at any desired position within the line to be printed, for instance, if a large amount is to be articulated into dollars and cents groups or if thousands groups are to be set off. For this purpose it is merely necessary to properly select the circuit connections for the selector switch UW. In the circuit diagram according to Fig. 5 such blank spaces, having the width of an individual printing character, are obtained simply by connecting the corresponding bank contact of selector UW to any of the stop magnets. For instance, in sector II of switch UW the stationary contact $II_2$ is left free. As a result, the second type carrier is not made operative during the second printing operation. Consequently, there is always a blank gap in this position (see Fig. 1) which separates the dollars group from the cents group. The same applies analogously for the blank space separating the thousands groups of the amount to be printed. The amount set up into a machine as: 135080 is printed as: 1 350 80 merely by virtue of the manner in which the selector UW is connected.

During the return of the type carriers to the zero position, the contact SAK again energizes the magnet FWM which advances the selector FW to the fourth position. This again applies voltage to the magnet UWM which switches the selector UW back to the normal position. The magnet FWM is simultaneously energized through the second contact bank of selector FW and causes the selector FW to move to its fifth position. Now the wind-up magnet WAM is temporarily energized through the second contact bank of selector FW and causes the carriage spring to be wound up as described. At the same time, the first contact bank of selector FW causes the contact arms of the selector to return to zero position. The magnet TM for arresting the carriage is likewise energized, namely through the second contact bank of selector FW. The selector FW is now set back to its initial position, and another cycle of printing operations may follow.

*Six-stage printing*

The narrow-spacing principle explained in the foregoing can also be applied if the type carriers are not each equipped with ten type faces denoting the numerals 0 to 9 as described above, but if a larger number of more diversified characters are to be printed and if these characters cannot all be arranged on one type carrier. Design requirements, for instance, may make it inadvisable to use a long row of type faces on an individual carrier, such as a row of twenty-six type faces for the alphabet and of ten type faces for the numerals. That is, it is in many cases desirable to use shorter type carriers with a correspondingly smaller number of type faces. If, for instance, a type carrier is to carry a row of thirteen type faces, then a total of thirty-nine different characters can be accommodated on three type carriers. In this case, the printing operation according to the narrow-spacing principle explained in the foregoing, requires operating in six consecutive steps of operation if any one of the thirty-nine available characters is to be printable upon any position of a line. If the somewhat larger expenditure in operating time required for the six-step printing is acceptable, as is the case with various business machines, then the six-step printing operation can be performed in a manner basically similar to that explained with reference to Fig. 5.

Figure 6:
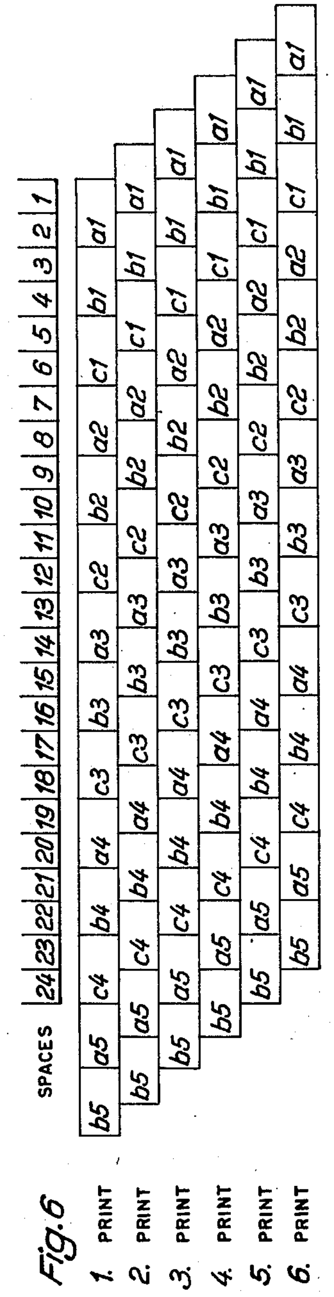
Fig. 6 is a schematic diagram explanatory of a multiple printing operation in six steps.
Figure 8:
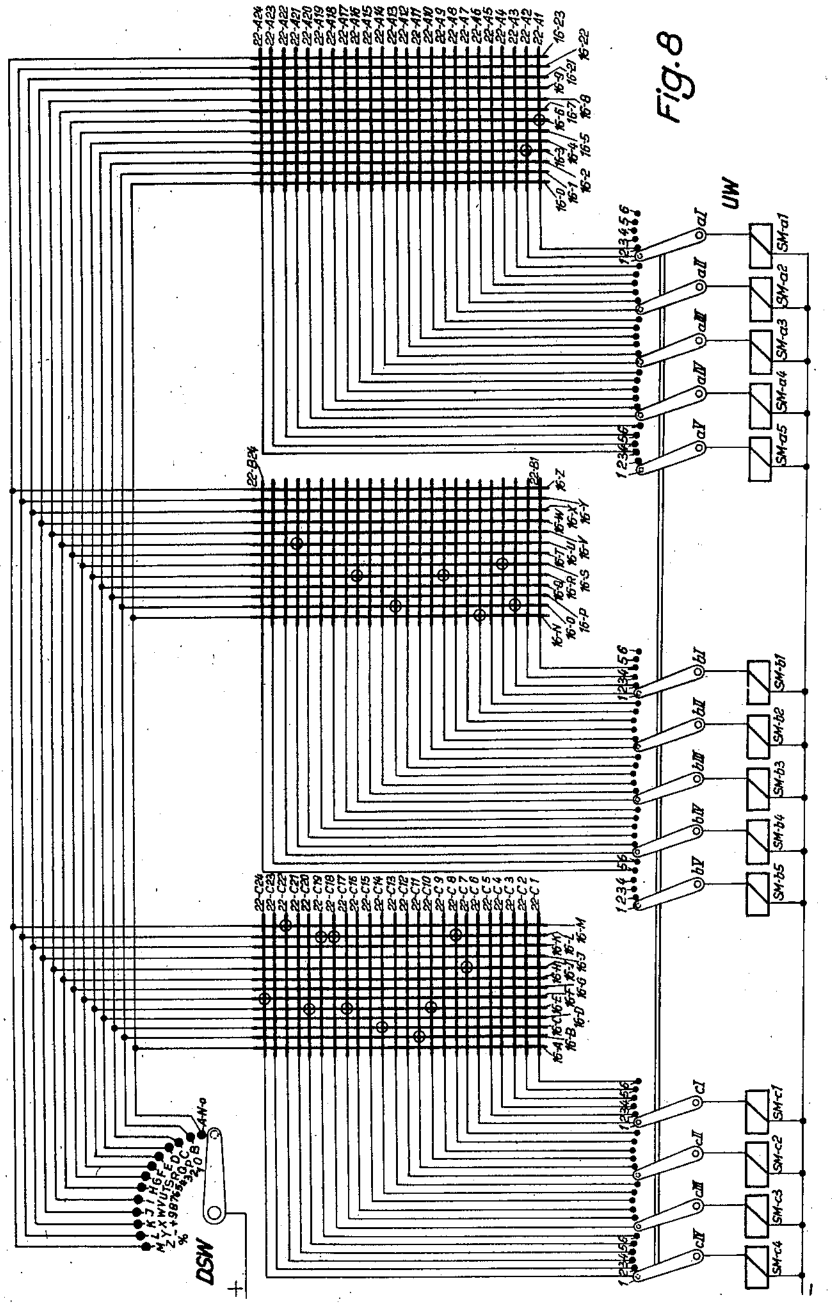
Fig. 8 is a schematic electric circuit diagram for performing a six-step printing operation according to Figs. 6 and 7 with the aid of a printing device otherwise similar to that shown in Figs. 2, 3 and 4.
Figure 13:
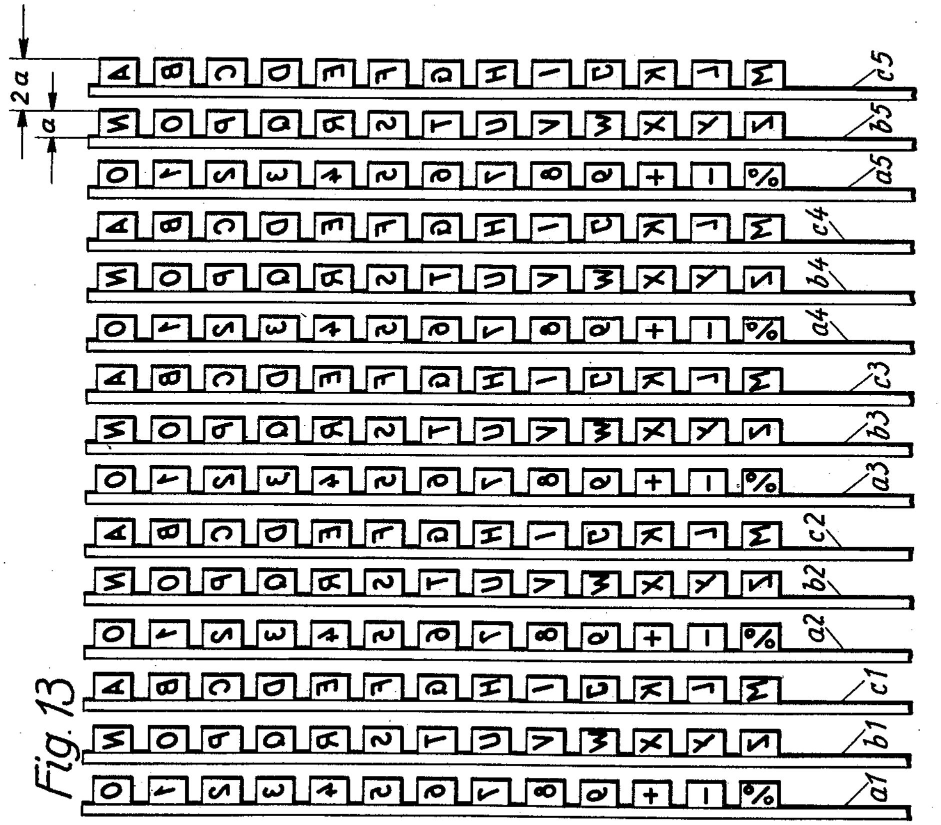
Fig. 13 is a front view of the sets of type used in the text printing device illustrated in Figs. 6–8.

Figs. 6, 8 and 13 serve to further elucidate such a six-step printing operation. The printing device proper has the same design as the one used for the two-step operation (see Figs. 2–4) except that the type carriers have the just mentioned number and arrangement of the type faces. The paper shifting device must move five steps while the complete impression of a line of characters is being produced; that is, the platen roller or other paper-accommodating device must shift laterally the width of one character after each individual step of printing operation.

The top row in Fig. 6 indicates the number of the individual spaces available in a single line of printing. The illustration relates to a line comprising a total of 24 steps including all blank spaces that may appear between the words or groups of the text. The next lower six horizontal rows in Fig. 6 represent schematically the arrangement of the type carriers. The type carriers *a*1 to *a*5 carry each the characters 0, 1, 2 . . . 9 as well as special characters such as punctuation marks (see Fig. 13). The type carriers *b*1 to *b*5 carry the type faces for characters N to Z, while the type carriers *c*1 to *c*4 carry the characters A to M. For simplifying the illustration Fig. 6 does not represent the movement of the paper in the five jumps but instead shows the entire array of type carriers as if it would jump laterally in five steps. This does not affect the result here of interest.

Figure 7:
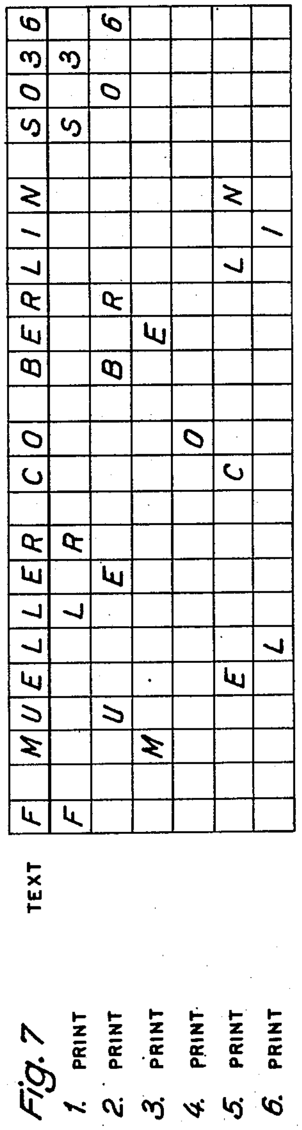
Fig. 7 is another schematic and explanatory illustration relating to a six-step operation for the printing of a line of text.

Fig. 7 shows in form of a tabulation the example of a composite text with intermittent blank spaces to be printed. The top row shows the complete text. The next following six rows indicate which particular characters are printed during each of the six consecutive printing operations needed for producing the complete impression.

The six-step printing requires a circuit system as exemplified by Fig. 8. While the system embodies the principle explained above with reference to Fig. 5, it departs from the system of Fig. 5 in that the contact bars 22 are divided into three electrically separate groups. Correlated to the horizontal contact bars 22–A1 to 22–A24 of the first group are the vertical contact bars 16–0 to 16–9, 16–Z1, 16–Z2 and 16–Z3. The contact bars 16–Z1 to 16–Z3 relate to special characters. That is, in the example of Fig. 8 these three contact bars are correlated to the characters: plus sign (+), minus sign (−), and percent sign (%) (see the corresponding notations next to distributor DSW as shown in Fig. 8). Correlated to the contact bars 22–B1 to 22–B24 of the second group are the cross bars 16–N, 16–O, 16–P . . . 16–Z. The vertical bars 22–C1 to 22–C24 of the third group are in cooperative relation to the cross bars 16–A, 16–B . . . 16–N. Electrically conductive connections between the contact bars in each of the three groups are again denoted by circles around the points of intersection.

The selector switch UW for this system has a number of contact arms *a*I to *a*V, *b*I to *b*V, and *c*I to *c*IV. These fourteen contact arms are interconnected to operate step-wise in unison. Each contact arm moves sequentially over six bank contacts. The switching from one to the next contact occurs after each individual step of printing operation. The contact arms are connected to the respective stop magnets SM–*a*1 to SM–*a*5, SM–*b*1 to SM–*b*5, and SM–*c*1 to SM–*c*4. The bank contacts of the selector UW are individually connected with the horizontal contact bars of the set up device as shown in Fig. 8.

It will be noted that in Fig. 8, for the purpose of lucid illustration, the stop magnets are illustrated in three groups SM–*a*1 to SM–*a*5, SM–*b*1 to SM–*b*5, and SM–*c*1 to SM–*c*4, although the actual arrangement of these magnets in the printing mechanism is in accordance with that of Fig. 6, namely, in the sequence *b*5, *a*5; c4, *b*4, *a*4; *c*3 . . . *a*1.

The distributor switch DSW shown in Fig. 8 is designed and operative as described with reference to the corresponding distributor in Fig. 5 except that distributor DSW in Fig. 8 is equipped with thirteen bank contacts. When the operation of the printing mechanism is initiated by the excitation of the printer control magnet DUM (Figs. 2, 4), the contact arm of distributor DSW rotates in synchronism with the lifting movement of the type carriers as explained previously. Also as explained, the respective stop magnets SM are excited at a moment of the synchronous motion at which the type face to be selected for printing on each type carrier has reached the printing position. The operative circuits for energizing the stop magnets at the proper moment and the subsequent release of the printing operation are otherwise the same as described with reference to the two-step printing.

As mentioned, each of the six steps of operation causes the production of a partial imprint, for instance, as exemplified in Fig. 7, so that the total impression is completed after termination of the sixth printing step.

We claim:

1. A printing device for business machines, comprising holding means for accommodating a paper to be imprinted and defining a maximum length of a single line of characters to be printed, a group of type carriers parallel to one another and forming a series parallel to the direction of said line of characters said group extending in totality over a length similar to said maximum length of said single line to be printed, each of said carriers having a row of different type faces and being displaceable transverse to said direction for selectively placing one of said respective type faces into printing position, set-up means for entering a line of characters to be printed, control means responsive to said set-up means and connected with said type carriers for selectively displacing said carriers, said control means having relative to said carriers a plurality of operating cycles for each line of characters entered into said set-up means whereby said carriers are operated a plurality of times for impressing the paper each time with only part of an individual line of characters, and paper-shift means connected with said holding means and controlled by said control means to shift the paper in said direction between consecutive printing operations of said carriers, whereby a single complete printed line is produced by interspersing on the paper a group of mutually spaced first-printed characters by later-printed characters.

2. In a printing device according to claim 1, said control means comprising an electric selector switch having a different position for each of said operating cycles.

3. A printing device for business machines, comprising holding means for accommodating a paper to be imprinted and defining a maximum length of a single line of characters to be printed, a group of type carriers parallel to one another and forming a series parallel to the direction of said line of characters, said group extending in totality over a length similar to said maximum length of said single line, each of said carriers having a linear row of respectively different type faces and being linearly displaceable in the direction of said row and transverse to said line direction for selectively placing one of said respective type faces into printing position, said group of type carriers comprising a plurality of subgroups each having in totality all of the different type faces to be printed so that each type carrier in said subgroup has a smaller number of type faces than said totality, set-up means for entering a line of characters to be printed, control means responsive to said set-up means and connected with said type carriers for selectively displacing said carriers, said control means having relative to said carriers a plurality of operating cycles for each line of characters entered into said set-up means whereby said carriers are operated a plurality of times for impressing the paper each time with only part of an individual line of characters, and paper-shift means connected with said holding means and controlled by said control means to shift the paper in said direction between consecutive printing operations of said carriers, whereby a single complete printed line is produced by interspersing on the paper a group of mutually spaced first-printed characters by later-printed characters.

References Cited in the file of this patent

UNITED STATES PATENTS

| | | |
|---|---|---|
| 926,318 | Crandall | June 29, 1909 |
| 1,785,999 | Bryce | Dec. 23, 1930 |
| 1,817,501 | Weinlich | Aug. 4, 1931 |
| 1,932,914 | Shelton | Oct. 31, 1933 |
| 2,047,505 | Hausheer | July 14, 1936 |
| 2,080,649 | Breitling | May 18, 1937 |
| 2,357,456 | Bryce | Sept. 5, 1944 |
| 2,398,036 | Paris | Apr. 9, 1946 |
| 2,688,916 | Baldwin | Sept. 14, 1954 |